Sept. 4, 1934.  S. J. ORNSTON  1,972,236
SEALING TOOL
Filed July 22, 1933  2 Sheets-Sheet 1
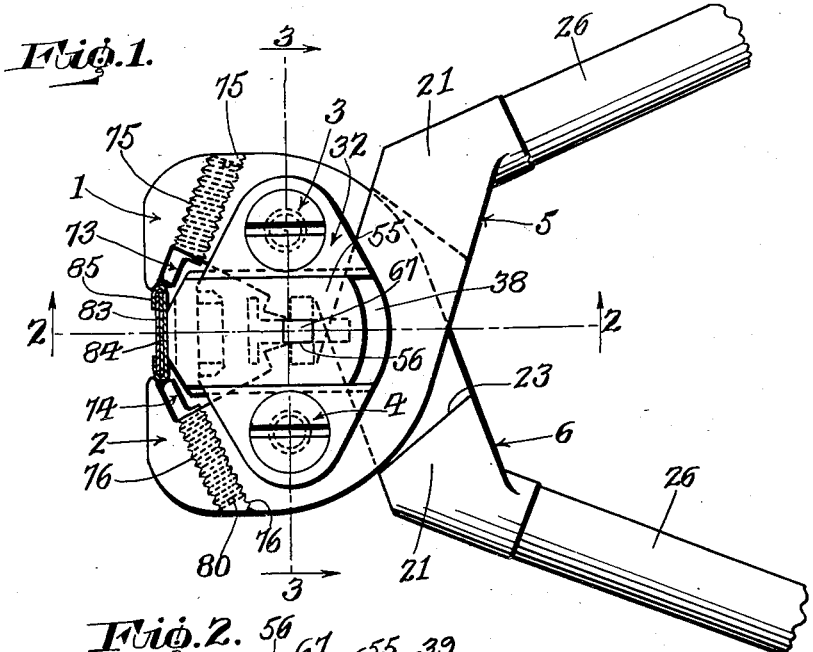
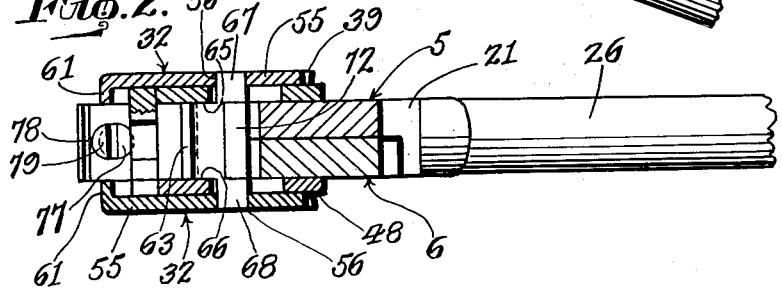
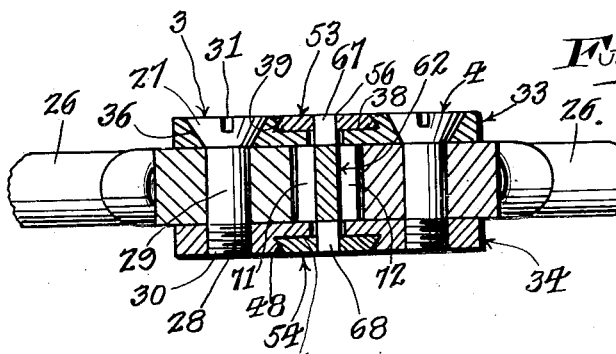
Inventor
Sidney J. Ornston
By Geo. F. Kimmel
Attorney Sept. 4, 1934.　　　S. J. ORNSTON　　　1,972,236
SEALING TOOL
Filed July 22, 1933　　　2 Sheets-Sheet 2
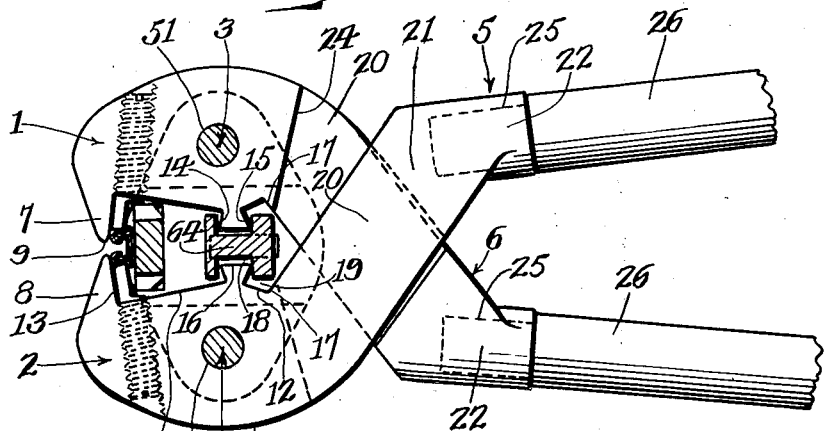
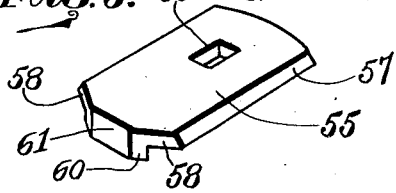
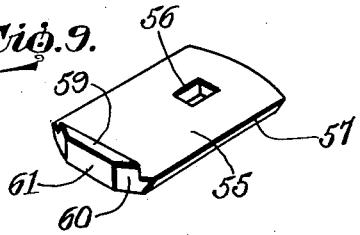
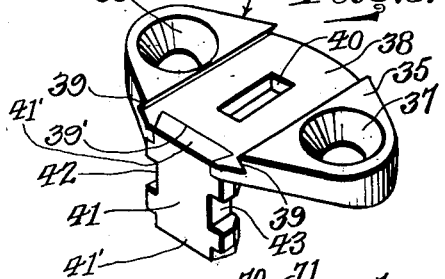
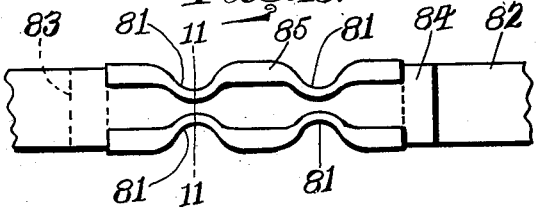
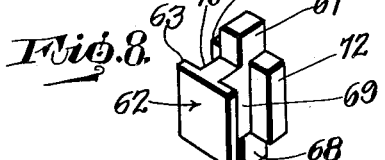
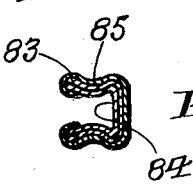
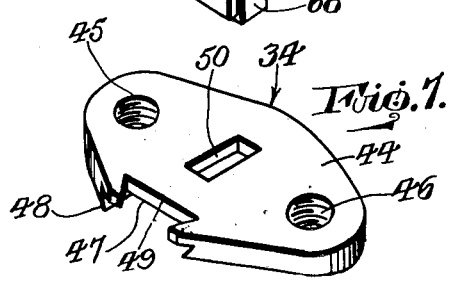
Inventor
Sidney J. Ornston
By Geo. P. Kimmel
Attorney Patented Sept. 4, 1934

1,972,236

UNITED STATES PATENT OFFICE 1,972,236

SEALING TOOL

Sidney J. Ornston, Brooklyn, N. Y., assignor to The Wire & Steel Products Co., Inc., Brooklyn, N. Y., a corporation of New York Application July 22, 1933, Serial No. 681,790

18 Claims. (Cl. 81—9.1)

This invention relates to a sealing tool designed to seal together the overlapped ends of a metal strap or band employed for connecting together various objects or as a metallic tie for packages, and the invention has for its object to provide, in a manner as hereinafter set forth, a tool of the class referred to operated by the application of pressure thereon for positively and permanently interlocking and sealing together, by crimping at spaced opposed points the overlapped ends of a metallic strap or tie band.

A further object of the invention is to provide, a tool of the class referred to and in a manner as hereinafter set forth, with an abutment means for arresting the inward movement of the base of the stock being acted upon during the crimping of the stock to provide the seal, and with such abutment being so supported and arranged as to move towards the base of the stock simultaneously with the operation referred to.

A further object of the invention is to provide, in a manner as hereinafter set forth, a tool of the class referred to including a coupling structure for the clamping jaws thereof and a pair of parallel spaced stationary work supports connected with said structure and with the latter slidable relative to the supports when operating the tool to and from sealing action upon the work.

A further object of the invention is to provide, in a manner as hereinafter set forth, a tool of the class referred to including a pair of oppositely disposed clamping jaws and a pair of oppositely disposed spaced crimping elements for acting simultaneously upon opposite sides of the stock to crimp the latter at two opposed points; the said elements being seated in, adjustably connected to, projecting from the inner side edges of and disposed at an inclination within the jaws.

Further objects of the invention are to provide, in a manner as hereinafter set forth, a sealing tool for the purpose referred to which is simple in its construction and arrangement, strong, durable, compact, thoroughly efficient when used, positive in action, conveniently operated and adjusted, readily assembled and comparatively inexpensive to manufacture.

To the above ends essentially and to others which may hereinafter appear, the invention consists of such parts and such combination of parts which fall within the scope of the invention as claimed.

In the drawings:

Figure 1 is a side elevation of the tool with the handle members thereof broken away.

Figure 2 is a section on line 2—2 Figure 1.

Figure 3 is a section on line 3—3 Figure 1.

Figure 4 is a side elevation partly in section of the tool.

Figure 5 is a perspective view of one of the work supports looking towards the outer side face thereof.

Figure 6 is a perspective view of one of the sections of the coupling structures for the jaws.

Figure 7 is a perspective view of the other section of the coupling structure for the jaws.

Figure 8 is a perspective view of the holder element for the work supports.

Figure 9 is a perspective view of a work support looking toward the inner side face thereof.

Figure 10 is a plan view of the work completed by the tool.

Figure 11 is a section on line 11—11 Figure 10.

The sealing tool includes a pair of oppositely disposed clamping jaws 1, 2 of like form each of which is shiftably mounted upon an independent pivot. The pivots for the jaws 1, 2 are indicated at 3, 4 respectively. The pivots are at fixed points with respect to and are bodily carried by the jaws where the latter are opened and closed relative to each other. Merging at their forward ends into the rear ends of the jaws 1, 2 are oppositely disposed shanks 5, 6 respectively which extend across each other at their forward ends.

The jaws 1, 2 at their forward or outer ends are formed with inwardly extending oppositely disposed tapered noses 7, 8 respectively constituting confiners for the work 9 operated upon by the tool. The shape of the noses is such that when the jaws are closed, the front faces of the noses from their inner ends extend outwardly at opposite inclinations and their inner or rear faces extend substantially at right angles to the longitudinal median of the tool. When the jaws are opened, the front faces of the noses extend substantially at right angles to and their innner or rear faces extend from their inner ends at opposite inward inclinations with respect to the longitudinal median of the tool.

Each clamping jaw is formed with a curved outer side edge 10 and an inner side edge formed of a pair of spaced oppositely inclined stretches 11, 12, the former being of greater length than the latter. The stretch 11 merges at its forward end into the inner end of the outwardly inclined inner face 13 of a nose at the forward end of a jaw. The inner edge of the jaw is formed with a pair of inwardly extending oppositely inclined stretches 14, 15 which merge at their outer ends into the ends of a stretch 16. The inner edge of the jaw is also formed with an inclined stretch 17. The stretches 14, 15, 16 and 17 are of less length than the stretch 11. The stretch 16 is offset with respect to the stretches 14, 15. The stretch 14 from its inner end inclines toward the outer end and the stretch 15 from its inner end inclines towards the rear end of the jaw. The rear end of stretch 11 merges into the inner end of stretch 14. The forward end of stretch 12 merges into the inner end of stretch 15. The rear end of stretch 12 merges into the inner end of stretch 15. The rear end of stretch 12 merges into the inner end of stretch 17, the latter at its outer end merging into the forward edge of a shank. The stretches 14, 15 provide stops for a purpose to be referred to. The stretch 16 of one jaw is arranged opposite and coacts with the stretch 16 of the other jaw to provide a passage 18. The stretches 12, 15 and 17 of each jaw coact to provide a pocket 19.

Each shank consists of a forward part 20, an intermediate part 21 merging into part 20 and a rear part 22 which merges into and is disposed substantially at right angles to part 21. The part 20 is of less thickness than and has its outer side face form a continuation of one side face of the part 21. The parts 20, 21 of the shank are disposed at an inclination with respect to part 22. The said part 20 extends from the rear or inner end of a jaw and the parts 20, 21 are disposed at an inward inclination from the forward end of the shank. As the part 20 is of less thickness than part 21, the shank is formed intermediate its ends with an inclined shoulder 23. The part 20 is of less thickness than that of a jaw and has its outer side face forming a continuation of one side face of the jaw whereby there is provided at the rear end of the latter a shoulder 24. The part 20 of one shank extends across and is slidable upon the part 20 of the other shank. The part 20 of shank 6 is arranged between the shoulder 23 on shank 5 and the shoulder 24 at the inner end of jaw 2. The part 20 of shank 5 is arranged between the shoulder 23 on shank 6 and the shoulder 24 at the inner end of jaw 1.

The part 22 of each shank is formed with an outwardly inclined socket 25 in which is anchored the reduced forward end of a handle member 26 of the desired length. When operating the tool pressure is applied to the handle members 26.

The pivots 3, 4 are of like form and each consists of a flared head 27 merging at its inner end into a shank 28 of circular cross section formed with a plane portion 29 and a threaded portion 30, Figure 3. The portion 29 is interposed between the portion 30 and the head 27 and upon which is mounted a clamping jaw. The head 27 is diametrically grooved at its outer end, as at 31 for the reception of a tool to position and remove a pivot.

The tool includes a slidable coupling structure 32 coacting with the pivots 3, 4 for permanently connecting the jaws 1, 2 together. The structure 32 also functions to provide a clearance and an abutment for the work 9 when the latter is operated upon, as well as a retainer for a work supporting means to be referred to.

The coupling structure 32 is formed of two sections 33, 34, Figures 6 and 7. The section 33 consists of a substantially oval-shaped plate 35 provided in proximity to its ends with the countersunk openings 36, 37. The outer side face of plate 35, between the openings 36, 37 is formed with a transverse guide groove 38 having the side walls 39 thereof oppositely incut. The groove 38 is open at each end and extends from the forward side edge to the rear side edge of plate 35. The central portion of the forward side edge of plate 35 is formed with a dove tail seat, as at 39' and the said seat portion is of a length less than the width of groove 38. The purpose of the latter will be referred to. The plate 35 is provided at its transverse center with a rectangular slot 40 intersected centrally thereof by the longitudinal median of the plate. The slot 40 opens into groove 38. Formed with dove tailed ends 41' is a rectangular work abutment 41 which is adapted to fit at one end into the dove tail seat 39'. The abutment 41 is of a width corresponding to the length of and of a thickness corresponding to the depth of the seat portion 39' at the forward edge of plate 35. The side edges of abutment 41 centrally thereof are formed with cutouts 42, 43, to provide clearances for the purpose to be referred to.

Section 34 of coupling structure 32 consists of a substantially oval-shaped plate 44 of the same form, length and width as the plate 35. The plate 44 in proximity to its ends is provided with openings 45, 46 having the walls thereof threaded. The outer side face of plate 44, between the openings 45, 46 is formed with a transverse guide groove 47 having the side walls 48 thereof oppositely incut. The groove 47 extends from the forward side edge to the rear side edge of plate 44. The latter at the central portion of its forward side edge is cut out, as at 49 to provide a dove tail seat for receiving the opposite dove tail end of the rectangular work abutment 41. The width of the cutout 49 is less than the width of groove 47 and the purpose of the latter will be presently referred to. Plate 44 at its transverse center has a rectangular slot 50 intersected centrally thereof by the longitudinal median of the plate. The slot 50 opens into the groove 47.

The plate 35 is positioned against one side and the plate 44 against the other side of the jaws 1, 2. The jaws 1, 2 are formed with openings 51, 52, respectively. When the plates are in the positions referred to the inner ends of openings 36, 37 register with one end of the openings 51, 52, respectively and the openings 45, 46 are disposed in concentric alignment with the openings 36, 37 respectively and register with the other ends of the openings 51, 52 respectively. The openings 51, 52 are positioned in the jaws 1, 2 respectively at a greater distance from the outer ends of the jaws than the distance between said openings and the inner ends of the jaws. The pivots 3, 4 also function to connect the jaws and structure 32 together and when the plates are positioned as stated the pivot 3 is extended through the registering openings 36, 51 and 45 and has its threaded portion 30 anchored to the wall of opening 45, and the pivot 4 is extended through the registering openings 37, 52 and 46 and has its threaded portion 30 anchored to the wall of opening 46. This arrangement couples the jaws and structure 32 together.

When the plates 35, 44 are secured in position, the abutment 41 has its free ends mounted in the seats provided by the cutouts 39' and 49, and the free end edge of such abutment is arranged to form a flush continuation of the bottom or inner wall of groove 47. The abutment 41 when seated in cutout 49 bridges the space between the plates 35, 44 at the forward sides of the latter.

When the plates 35, 44 are connected to the jaws 1, 2, the slots 40 and 50 are arranged in alignment, the heads of the pivots countersunk in the openings 36, 37 and the outer ends of the shanks 28 flush with the outer side face of plate 44.

Mounted in the grooves 38, 47 are a pair of oppositely disposed substantially permanently stationary coacting parallel spaced supports 53, 54 respectively for the work 9. Each of said supports is of like form and it consists of a rectangular plate 55 formed between its transverse median and its rear end with a rectangular slot 56 which is to align with and is of less length than a slot 40 or 50. The lengthwise edges of plate 55 are oppositely beveled as at 57 and are overlapped by the incut side walls of the groove 38 or 47 in which the plate 55 is mounted. The plate 55 has its forward corners 58 oppositely beveled and at its forward end it is provided with an inwardly extending flat flange 59 of a length less than the width of the plate. The flange 59 is flush with and forms an inward continuation of the central portion of the forward edge of the plate 55. The ends 60 of flange 59 are oppositely beveled and flush with a part of the beveled forward corners 58 of the plate. The forward face of flange 59 and the central portion of the forward edge of plate 55 provides a seat 61 for the work 9. The plates 35 and 44 when the jaws 1 and 2 are moved towards and from each other slide relatively to the supports 53, 54.

Positioned between the inner side edges of the jaws and interposed between the plates 35, 44 is a holder element 62 for the supports 53, 54 and which consists of a squared head 63 having integral with its rear face centrally thereof a rearwardly extending stem 64 provided at its side edges 65, 66 with rectangular protuberances 67, 68 respectively and at its side faces 69, 70 with oblong flanges 71, 72 respectively. The length of the protuberances 69, 70 extend in the same direction as the direction of the length of the slots 40, 50 respectively. The protuberances 69, 70 pass through and are of less length than the slots 40, 50 respectively and seat in and snugly fit throughout the slots 56 of the supports 53, 54. As the slots 40, 50 are of greater length than the protuberances 69, 70, provision is had for the moving of the plates 35, 44 relative to the supports 53, 54. The element 62 when positioned between the jaws 1, 2 has its head 63 arranged forwardly of and overlapping the stops provided by the stretches 14 on the inner edges of the jaws, its stem 64 extended through passage 18 formed by the opposed stretches 16 on the inner side edges of the jaws and its oblong flanges 71, 72 arranged in the pockets 19 and positioned rearwardly of and opposing the stretches 15. The latter provide stops. The arrangement just referred to arrests the lengthwise shifting of element 62 and supports 53, 54 relative to the jaws 1, 2.

The jaws 1, 2 carry a pair of oppositely disposed adjustable inclined crimping elements 73, 74 respectively and for such purpose the jaws 1, 2 are formed with a pair of oppositely inclined transversely extending openings 75, 76 respectively. The elements 73, 74 are so positioned and formed as to have the crimper parts thereof to extend forwardly of the work supports 61 when such parts perform their crimping function. The opening 75 or 76 extends from the outer side edge to the inner side edge of a jaw and has the forward side of its wall thereof disposed in the plane of the rear face of a nose 7 or 8. The wall of each of said openings is threaded throughout. Each crimping element consists of a peripherally threaded shank 77 of circular cross section provided at its inner end with an inwardly directed curved crimper 78 of segmental cross section. The crimper 78 is the active end of the crimping element and is formed with a rounded free end edge 79. The said active end or crimper 78 is arranged in close proximity to the rear or inner face and is of less length than that of a nose 7 or 8. The forward side of the said active end or crimper 78 is flush with and forms an inward continuation of the forward side of shank 77. The latter adjustably engages with the threaded wall of an opening 75 or 76 and is provided at its outer end with a groove 80 for the reception of a tool, not shown for adjusting the crimping element relative to a jaw. The cutouts 42, 43 provide clearances for the inner ends of the shanks 77 of the elements 73, 74. See Figure 4. The said active ends of crimpers 78 of the crimping elements 73, 74 extend forwardly of the work supports 53, 54.

The supports 53, 54 are of a length greater than the width of plates 35, 44 and the flanges 59 of said supports extend inwardly toward each other and over abutment 41, but do not extend between the jaws. The flanges 59 are disposed at right angles to the noses 7, 8 and are arranged rearwardly of the latter. When the jaws are opened, the structure 32 shifts rearwardly with respect to the supports 53, 54 as shown in Figure 1. When the jaws are moved towards each other the structure 32 is shifted forwardly with respect to the supports 53, 54 whereby the abutment 41 is positioned in close proximity to, but spaced from the flanges 59. See Figure 4. When the crimpers 78 are brought to bear against the sides of the work and pressure is applied to the jaws through the moving of the handle members toward each other, the work is acted upon to assume the shape and sealed as indicated at 81, Figure 10. As the crimpers 78 are moved toward each other, when bearing upon the sides of the work 9, the base of the latter move inwardly, but its movement is limited by the abutment 41 which prevents a transverse bend being formed in the work rearwardly of the crimped portions as indicated at 81.

With reference to Figure 10, there is shown a metallic tie 82 in the form of a flat strap. The end terminal portions of the tie 82 designated at 83, 84 are arranged in overlapped relation. An inwardly flanged coupling strip 85 is positioned upon the overlapped portions 83, 84 of the tie and which sets up the strap in the form of a band. The strip 85 with the portions 83, 84 of the tie are seated upon the flanges 59 and the tool is then operated to crimp the tie and strip at opposite stretches thereof in the manner as shown at 81. Such crimping not only seals and connects the end portions of the tie and strip together, but also locks the tie or strap and strip in a manner to prevent the separation from one to the other. The end terminal portions of the strap, the latter forming the tie, may be locked and sealed together by crimping opposite stretches thereof without employing the coupling strip.

It will be assumed that the tool is to be used when it is in an inverted upstanding position and that the jaws have been opened as is shown in Figure 4. When the tool is so disposed, the work supports extend from the lower or outer lengthwise edges of the plates 35, 44 of the coupling structure 32. The position referred to by the work supports is due to the fact that when the jaws are opened the coupling structure is carried thereby causing the plates 35, 44 to move upwardly in a direction from the outer to the inner ends of the work supports. The portions of these latter extended from the lower or outer lengthwise edges of the plates 35, 44 will be as shown in Figure 4. The work supports are arranged against the rear face of the strip 85 which encompasses the overlapped ends of the tie 82 and in this connection see Figure 1. At this point the side flanges of the strip 85 are positioned in the path of the oppositely inclined crimpers 78. By moving the handle members 26 towards each other, the jaws 1, 2 are moved to closing position carrying pivots 4, 5 and crimping elements 73, 74 therewith and moving plates 35, 44 downwardly towards the outer ends of the work supports. As the plates 35, 44 move downwardly, the work abutment will be carried therewith to a point in close proximity to the inner faces of the flanges 59 of the work supports. As the jaws 1, 2 move towards each other the crimpers 78 will act upon the flanges of the strip 85 and the overlapped ends of the tie 82 to form a pair of oppositely disposed crimps 81 such as shown in Figure 10 and the work acted upon will appear as illustrated in Figure 1. This action may be repeated to form two spaced pairs of crimps as shown in Figure 10. The crimping of the tie and strip provides a seal between the ends of the tie to prevent separation of said ends and sets up the tie as of closed band-like form. If the tool is used in a horizontal position or an upstanding non-inverted position, the action of the parts of the tool would be the same as referred to, but with respect to the direction in which the tool is positioned.

The slots 40 in the plates 35, 44 permit of the coupling structure 32 sliding in opposite directions on the jaws with respect to the holder element and work supports. The inter-extending parts of the jaws and holder element and the anchoring of the work supports to the holder element provide for the disposing of the latter and work supports substantially at a fixed point.

When the jaws are opened and the tool is to be used, the front faces of the noses are disposed flatwise throughout against the object to which the tie is to be attached. When the jaws are moved towards each other to provide for the crimping or sealing of the tie, the outer or front faces of the noses from their outer ends are disposed at opposite inclinations with respect to the object referred to. It would appear that the work supports would shift relative to the coupling structure when the noses are moved from and to their initial position referred to, such position being when the jaws are extended, but this is not so because the coupling structure slides towards and from the outer ends of the work supports on the closing and opening of the jaws. The preventing of the shifting of the work supports with respect to the coupling structure is had by the interengaging of the jaws with the holder element, the clearance slots 40 in the coupling structure and the fixedly securing of the work supports to the lug 67 which pass through the slots 40.

What I claim is:—

1. In a sealing tool, a pair of clamping jaws having inner side edges, a coupling means for said jaws including an independent pivot for each jaw, a pair of oppositely disposed parallel work supports mounted in said means and formed at their forward ends with work seats extending toward each other, said means being slidable relative to said supports on the opening and closing of the jaws and including an abutment for the work positioned rearwardly of said seats, oppositely disposed work crimper elements carried by and extended from the inner side edges of the jaws forwardly with respect to said seats, and a holder element arranged between the jaws, extending through said means and engaging in said supports for maintaining them stationary, said means being slidable relative to said holder element, and said element and jaws having coacting means to arrest the lengthwise shifting of the holder element relative to the jaws.

2. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, and said coupling means being bodily carried with the jaws and slidable relative to said work supporting means.

3. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, said coupling means being bodily carried with the jaws and slidable relative to said work supporting means, and oppositely disposed spaced work crimping elements carried by the jaws and crimpers extending forwardly of said work supporting means.

4. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, said coupling means being bodily carried with the jaws and slidable relative to said work supporting means, and oppositely disposed spaced adjustable inclined work crimping elements carried by the jaws and crimpers extending forwardly of said work supporting means.

5. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, and said coupling means being bodily carried with the jaws and slidable relative to said work supporting means, said work supporting means including at the forward end thereof spaced aligning seats for the work, said seats overlapping said abutment.

6. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, said coupling means being bodily carried with the jaws and slidable relative to said work supporting means, and oppositely disposed spaced work crimping elements carried by the jaws and crimpers extending forwardly of said work supporting means, said work supporting means including at the forward end thereof spaced aligning seats for the work, said seats overlapping said abutment.

7. In a sealing tool, pivoted jaws, means moving with and on each side of the jaws for coupling them together and having as a part thereof an abutment arranged between the jaws for the work, and stationary work supporting means connected with said jaws and coupling means and extended forwardly of said abutment, said coupling means being bodily carried with the jaws and slidable relative to said work supporting means, and oppositely disposed spaced adjustable inclined work crimping elements carried by the jaws and crimpers extending forwardly of said work supporting means, said work supporting means including at the forward end thereof spaced aligning seats for the work, said seats overlapping said abutment.

8. In a sealing tool, pivoted jaws, slidable means for coupling the jaws together and including an abutment for the work, and stationary work supporting means connected with said coupling means and extended forwardly of said abutment, said coupling means being bodily carried with the jaws and slidable relative to said work supporting means, oppositely disposed spaced work crimping elements carried by the jaws, and holder means for said work supporting means, said holder means being arranged between the jaws, said jaws and holder means having coacting parts to arrest shifting of the holder means lengthwise with respect to the jaws.

9. In a sealing tool, pivoted jaws, slidable means for coupling the jaws together and including an abutment for the work, and stationary work supporting means connected with said coupling means and extended forwardly of said abutment, said coupling means being bodily carried with the jaws and slidable relative to said work supporting means, oppositely disposed spaced work crimping elements carried by the jaws and arranged forwardly of said work supporting means, said work supporting means including at the forward end thereof spaced aligning seats for the work, said seats overlapping said abutment, and holder means for said work supporting means, said holder means being arranged between the jaws, said jaws and holder means having coacting parts to arrest shifting of the holder means lengthwise with respect to the jaws.

10. In a sealing tool, pivoted jaws, means coupling the jaws together and including an abutment for the work, and stationary work supporting means connected with said jaws and coupling means and extended forwardly of said abutment, said coupling means being bodily carried with the jaws and slidable relative to said work supporting means, oppositely disposed spaced work crimping elements carried by the jaws, the active ends of the crimping elements extending forwardly of said work supporting means, said crimping elements projecting at their inner ends from the inner side edges of the jaws, and said jaws being formed with oppositely disposed spaced noses extending inwardly with respect to said inner side edges and arranged forwardly and in close proximity to the inner ends of the crimping elements.

11. In a sealing tool, pivoted jaws, means coupling the jaws together and including an abutment for the work, and stationary work supporting means connected with said jaws and coupling means and extended forwardly of said abutment, said coupling means being bodily carried with the jaws and slidable relative to said work supporting means, oppositely disposed spaced adjustable inclined work crimping elements carried by the jaws, the active ends of the crimping elements extending forwardly of said work supporting means, said crimping elements projecting at their inner ends from the inner side edges of the jaws, and said jaws being formed with oppositely disposed spaced noses extending inwardly with respect to said inner side edges and arranged forwardly of and in close proximity to the inner ends of the crimping elements.

12. In a sealing tool, a pair of jaws, each mounted intermediate its ends upon a pivot, a slidable coupling structure arranged at opposite sides of the jaws, carrying the pivots for the jaws and including a work abutment disposed between the jaws, parallel stationary work supports mounted on said structure and extended forwardly from the latter, said structure being slidable relative to said supports, oppositely disposed adjustable crimper elements carried by and extended from the inner side edges of the jaws, said elements being positioned forwardly of said supports, said abutment being arranged rearwardly of the forward ends of said supports, and means for maintaining said supports stationary with respect to said jaws and structure.

13. In a sealing tool, a pair of jaws, each mounted intermediate its ends upon a pivot, a slidable coupling structure arranged at opposite sides of the jaws, carrying the pivots for the jaws and including a work abutment disposed between the jaws, parallel stationary work supports mounted on said structure and extended forwardly from the latter, said structure being slidable relative to said supports, oppositely disposed adjustable crimper elements carried by and extended from the inner side edges of the jaws, said elements being positioned forwardly of said supports, said abutment being arranged rearwardly of the forward ends of said supports, means for maintaining said supports stationary with respect to said jaws and structure, and said abutment having its sides formed with cutouts to provide clearances for said crimper elements.

14. In a sealing tool, a pair of jaws, each mounted intermediate its ends upon a pivot, a slidable coupling structure arranged at opposite sides of the jaws, carrying the pivots for the jaws and including a work abutment disposed between the jaws, parallel stationary work supports mounted on said structure and extended forwardly from the latter, said structure being slidable relative to said supports, oppositely disposed adjustable crimper elements carried by and extended from the inner side edges of the jaws, the active ends of the crimping elements extending forwardly of said supports, said abutment being arranged rearwardly of the forward ends of said supports, means for maintaining said supports stationary and for connecting them with said structure, and said work supports at their forward ends being formed with oppositely extending parallel spaced work seats overlapping said abutment.

15. In a sealing tool, a pair of parallel spaced stationary supports having their forward ends provided with work supporting seats, pivoted clamping jaws extended forwardly from said seats and movable toward and from each other, means moving with and on each side of the jaws for coupling them together and having as a part thereof an abutment arranged between the jaws for the work, said abutment being positioned rearwardly of said seats and shiftable from and towards said seats respectively when the jaws are moved away and towards each other, and spaced work crimping elements carried by the jaws and including crimpers extending forwardly of said seats.

16. In a sealing tool, a pair of parallel spaced stationary supports having their forward ends provided with work supporting seats, pivoted clamping jaws extended forwardly from said seats and movable towards and from each other, means moving with and on each side of the jaws for coupling them together and having as a part thereof an abutment arranged between the jaws for the work, said abutment being positioned rearwardly of said seats and shiftable from and towards said seat respectively when the jaws are moved away and towards each other, and spaced work crimping elements carried by the jaws and including crimpers extending forwardly of said seats, said jaws having their forward ends provided with inwardly extending spaced noses, said elements being extended inwardly with respect to the inner side edges of the jaws and having the crimpers thereof arranged in close proximity to the rear faces of the noses.

17. In a sealing tool, a pair of oppositely movable clamping jaws, oppositely disposed shanks at the inner ends of said jaws, one of said shanks extending across and sliding upon the other, handle members connected to the inner ends of the shanks and inclining away from opposite sides of the longitudinal median of the tool, each of said jaws being formed with an opening, the openings in said jaws being positioned at a greater distance from the outer ends of the jaws than the distance between the openings and inner ends of the jaws, pivots for the jaws loosely extending through said openings, slotted means moving with and on each side of the jaws, said means carrying said pivots for coupling said jaws together and having as a part thereof an abutment arranged between the jaws for the work, stationary work supporting means mounted in the outer side faces of said coupling means and including work seats arranged forwardly of said abutment, said coupling means being bodily carried by the jaws and slidable in opposite directions with respect to said work supporting means for moving said abutment from and towards said seats on the opening and closing of the jaws, and a holder element arranged between and interengaging with the jaws, extending through the slots of the coupling means and anchored to said work supporting means.

18. In a sealing tool, a pair of oppositely movable clamping jaws, oppositely disposed shanks at the inner ends of said jaws, one of said shanks extending across and sliding upon the other, handle members connected to the inner ends of the shanks and inclining away from opposite sides of the longitudinal median of the tool, each of said jaws being formed with an opening, the openings in said jaws being positioned at a greater distance from the outer ends of the jaws than the distance between the openings and inner ends of the jaws, pivots for the jaws loosely extending through said openings, slotted means moving with and on each side of the jaws, said means carrying said pivots for coupling said jaws together and having as a part thereof an abutment arranged between the jaws for the work, stationary work supporting means mounted in the outer side faces of said coupling means and including work seats arranged forwardly of said abutment, said coupling means being bodily carried by the jaws and slidable in opposite directions with respect to said work supporting means for moving said abutment from and towards said seats on the opening and closing of the jaws, a holder element arranged between and interengaging with the jaws, extending through the slots of the coupling means and anchored to said work supporting means, said jaws at their outer ends being formed with inwardly extending oppositely disposed noses, and oppositely inclined crimping devices adjustably mounted in said jaws transversely and in proximity to the outer ends of the latter, said devices including crimpers adjacent the inner edges of the jaws positioned in proximity to the inner sides of said noses and extending forwardly of said seats.

SIDNEY J. ORNSTON.